June 8, 1954 — N. S. YOUNG — 2,680,332
WELDING GLASS PARTS
Filed Jan. 24, 1951 — 2 Sheets-Sheet 2
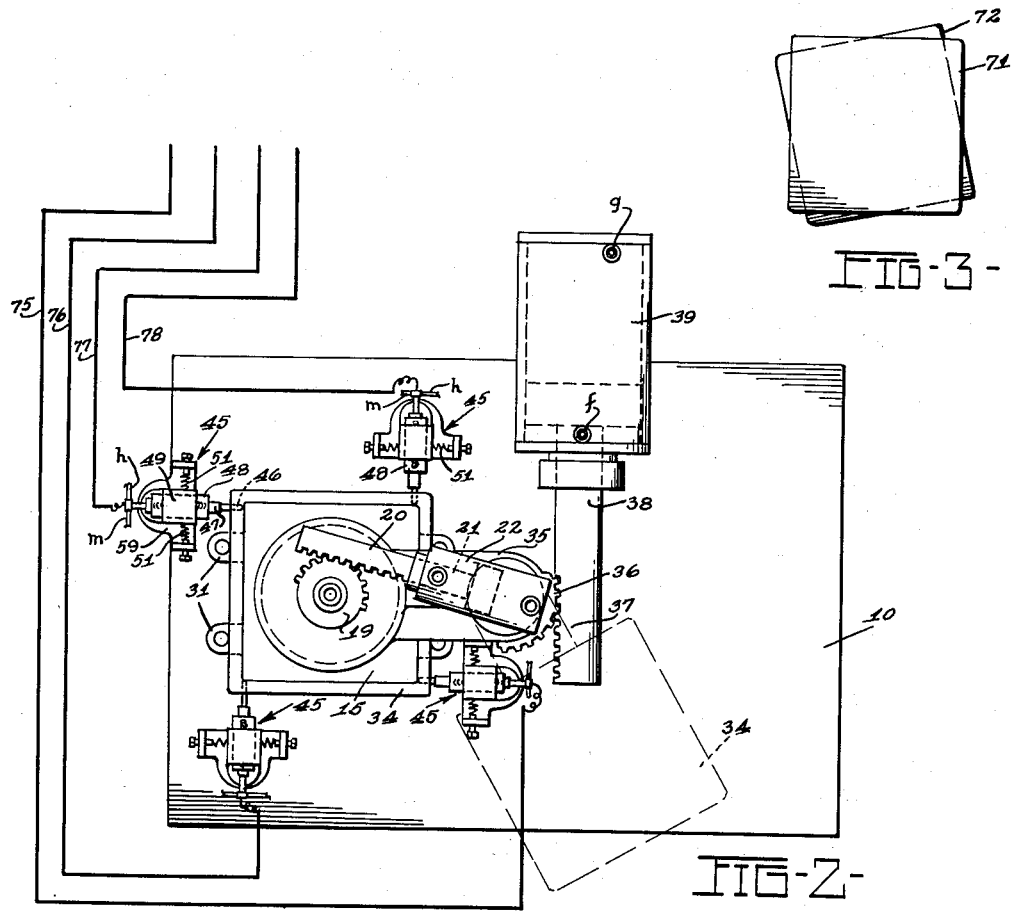
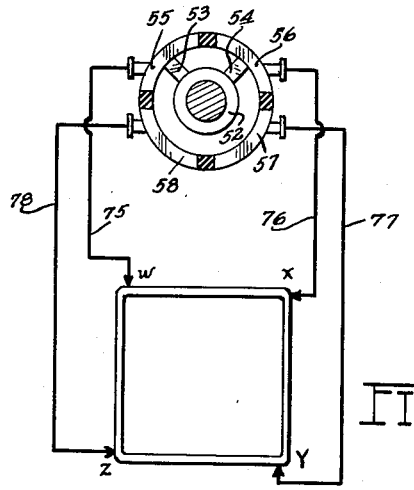
INVENTOR:
NORTON S. YOUNG.
BY Rule and Hoge,
ATTYS.

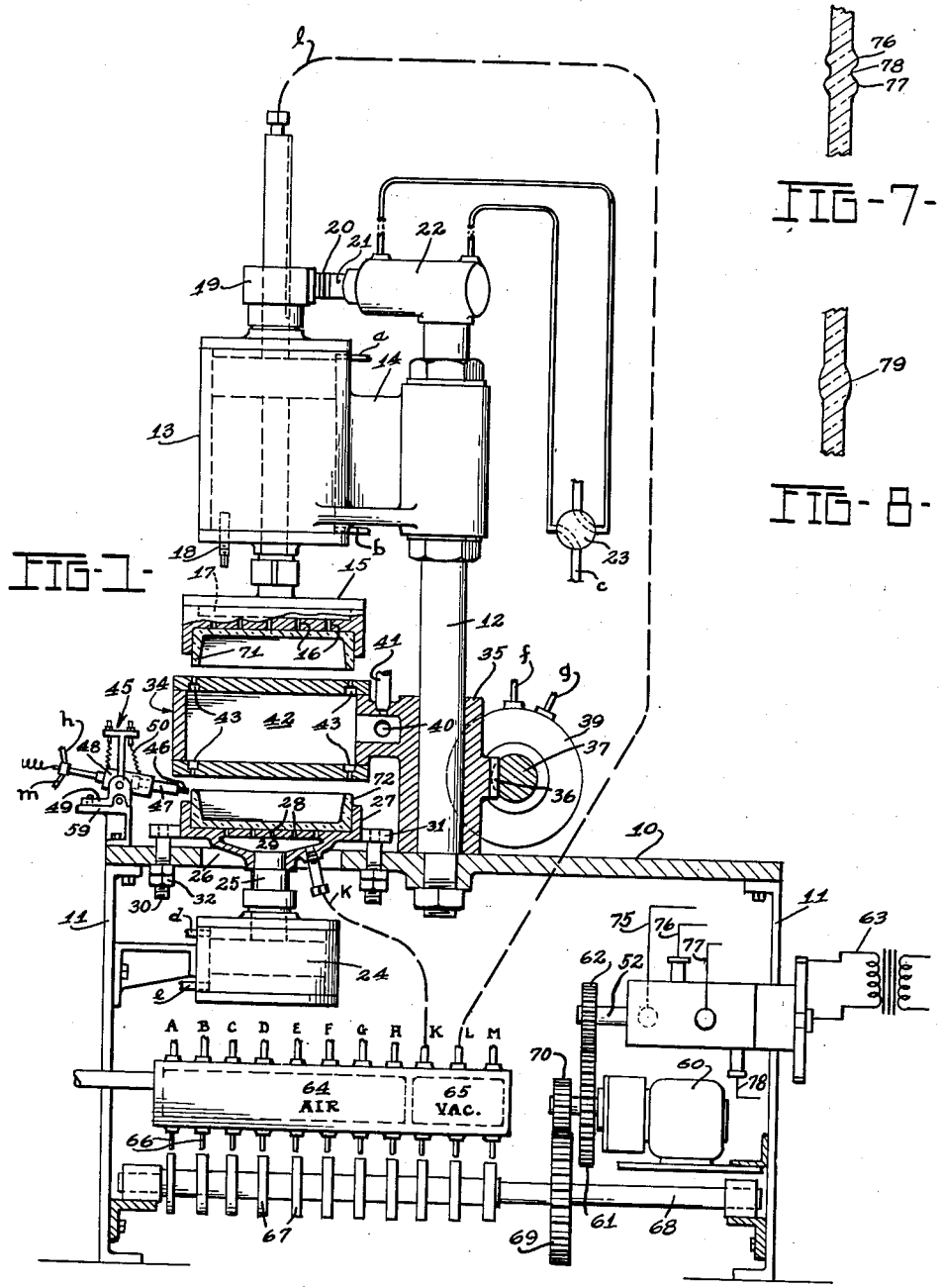

Patented June 8, 1954

2,680,332

UNITED STATES PATENT OFFICE 2,680,332

WELDING GLASS PARTS

Norton S. Young, Waterville, Ohio, assignor to Owens-Illinois Glass Company, a corporation of Ohio Application January 24, 1951, Serial No. 207,603

3 Claims. (Cl. 49—82)

This invention relates to the welding of glass parts and more particularly to a method for welding preformed complementary glass parts into a unitary hollow glass article such as a glass block, television tube or the like.

It is common practice in the prior art to position the complementary parts in spaced relation and heat the marginal surface portions thereof to a welding temperature by using a flame including natural gas, air, and oxygen. The parts are then brought together to form the unitary article. In order to insure the formation of a good seal, the surfaces which have been heated must be pressed together with considerable force. This forms a heavy and undesirable bead at the sealing line of the article. In order to diminish the size of this bead, it is customary to stretch or work the parts in opposite directions. This however, has the adverse effect of producing a double bead with a relatively thin portion between the two beads. The double bead is also very undesirable since it provides an area wherein high stress concentration may occur thereby weakening the seal.

It is therefore an object of this invention to provide a method of welding glass parts whereby a smooth and perfect weld is obtained.

It is a further object to provide a method of forming a unitary hollow glass article wherein the sealing surfaces are maintained at a welding temperature for a sufficient length of time to permit proper working and alignment of the parts.

Other objects of the invention will appear hereinafter.

Referring to the accompanying drawings:

Fig. 1 is a part sectional elevational view of an apparatus which utilizes my method, portions of the apparatus being shown diagrammatically;

Fig. 2 is a plan view of the same;

Fig. 3 is a diagrammatic representation of the relative misalignment of the complementary parts;

Fig. 4 is a diagrammatic view of a portion of the electrical circuit;

Fig. 5 is a sectional view of the article after the heated surfaces have been brought together to form the heavy bead;

Fig. 6 is a sectional view of the article after the parts have been stretched in opposite directions;

Fig. 7 is an enlarged view of the weld in Fig. 6 showing the double bead which is formed when the parts are stretched; and Fig. 8 is an enlarged view of the weld after it has been electrically energized.

Basically, my method comprises the following steps: heating the edge surfaces of the complementary parts to a welding temperature; bringing the parts together; relatively moving the parts in the opposite direction to stretch the glass; and electrically energizing the weld to form a smooth and perfect seal.

It will be seen that certain steps of this method may be changed to obtain particular results or operating conditions.

As shown in Fig. 1, the apparatus comprises a table or platform 10 supported on uprights 11. A vertical shaft 12 is bolted to the table 11 and extends upwardly above the surface of the table. A vertical piston motor 13 is mounted on the shift 12 by means of a bracket 14. A part-supporting chuck 15 is mounted on the lower end of the piston motor shaft. The chuck includes openings 16 in the face thereof to a chamber 17 which in turn is connected to a vacuum line $l$ through the piston motor shaft. Air connections $a$ and $b$ are provided to each end of the piston motor in order to supply air and actuate the piston to move the check 15 up and down. A stop 18 is provided in the lower end of the piston motor 13 to limit the downward movement of the piston motor shaft.

A pinion 19 is splined to the piston motor shaft and is meshed with a rack 20 formed on a piston shaft 21 of an indexing cylinder 22 mounted on the vertical shaft 12. Air connections are provided in this cylinder in order to supply air to the cylinder and actuate the piston and rotate the piston motor shaft of the vertical cylinder and rotatively adjust the position of the chuck 15. Air is alternately applied to the lines to either end of the indexing cylinder by manipulation of a manually operated two-way valve 23 connected to air line $c$.

A lower piston motor 24 is mounted on the uprights 11 below the surface of the table 10. A shaft 25 of the piston motor extends upwardly and in alignment with the shaft of the upper motor 13 through an opening 26 in the table 10. A chuck 27 is mounted on the shaft 25. The face of the chuck is provided with a series of openings 28 connected to a chamber 29 which in turn is connected to a vacuum line $k$. Air lines $d$ and $e$ supply air to the ends of the lower piston motor to move the chuck 27 up and down.

The downward movement of the chuck 27 is limited by contact with the upper surface of the table 10. The upward movement of the chuck 27 is limited by the bolts 30 fastened to extensions 31 of the chuck and extending downwardly through openings in the table 10. Nuts 32 are provided on the lower ends on the bolts below the surface of the table 10 to permit adjustment of the upward movement.

A burner 34 is mounted for movement into and out of operating position between the chucks 15 and 27 by means of a bracket 35 rotatable about the vertical shaft 12. As shown in Fig. 2 the bracket 35 is formed with a gear segment 36 which meshes with a gear rack 37 on a piston shaft 38 of a burner positioning motor 39. Air connections $f$ and $g$ are provided to either end of the burner positioning motor 39 to supply air and operate the motor and swing the burner into and out of position.

The burner is provided with an opening 40 to a source of combustible gases and an opening 41 to a source of $SO_2$ gas. These gases enter the burner, are mixed in a chamber 42 and are burned and emanate as flames through openings 43. The openings 43 are so arranged and distributed as to evenly heat the edge surfaces of complementary hollow parts 71, 72 herein shown as parts which are joined to form a glass block. The $SO_2$ gas is found desirable in order to eliminate the bubble formation which usually takes place when a high temperature gas flame is applied to a glass surface. The use of $SO_2$ gas is disclosed and claimed in the application of Robert R. Kegg, entitled "Glass Welding Method," Serial Number 163,872, filed May 24, 1950, and issued May 13, 1952, as Patent No. 2,596,694.

Electrode assemblies 45 are positioned at intervals along the sides of the chuck 27 and are provided with electrodes 46 which are reciprocable into and out of contact with the glass welding surface. As shown in Fig. 1, the electrodes 46 are mounted in small pistons 47 reciprocable in cylinders 48. Each of the cylinders 48 has connected thereto at one end thereof, a line $h$ to a source of air and a line $m$ to a source of vacuum. Application of air to the cylinders 48 forces the electrodes 46 into contact with the glass and conversely application of vacuum to the end of the cylinders 48 moves the electrodes 46 out of contact with the glass. Provision is also made for yielding movement of the electrodes about horizontal and vertical axes. As shown in Fig. 1, each cylinder 48 pivots about a horizontal pin in a bracket 49. Springs 50 yieldingly retain the cylinder in the normal or desired position with respect to the horizontal axis. The bracket 49 is in turn pivoted about the vertical axis through a pin on the mounting bracket 59. Springs 51 (Fig. 2) yieldingly retain the electrodes in their normal or desired position with respect to the vertical axis.

Provision is made for successively energizing the segments of the welding surface as shown schematically in Fig. 4. Electrical contacts 53, 54 are mounted on a rotatable distributor shaft 52 and are connected to the secondary of the high frequency transformer 63 (Fig. 1). The electrical contacts successively contact electrical segments 55, 56, 57, and 58 spaced apart and mounted in the form of a stationary ring. Lead wires 75, 76, 77, and 78 provide a circuit between the segments and the electrodes schematically shown at points $w$, $x$, $y$, and $z$. When the shaft 52 containing contacts 53 and 54 is rotated, the contacts will successively energize the segments 55, 56, 57, and 58. This will result in a current flow through the respective wires and electrodes and thereby successively energize the weld segments $w-x$, $x-y$, $y-z$, and $z-w$. The mechanism for rotating the shaft 52 is diagrammatically shown in Fig. 1 as comprising a motor 60 and a gear 61 on the motor shaft meshed with a gear 62 on the shaft 52.

The sources of air and vacuum are shown in Fig. 1 as comprising an air chamber 64 and a vacuum chamber 65 with air lines A, B, C, D, E, F, G, and H extending from the air chamber and connected respectively to the air lines $a$, $b$, $c$, $d$, $e$, $f$, $g$, and $h$ to the various piston motors. Vacuum lines K, L, and M extend from the vacuum chamber 65 and are connected respectively to the various vacuum lines. The air and vacuum lines from the respective chambers are opened and closed by a series of valves 66 actuated by a series of cams 67. The cams are mounted on a horizontal shaft 68 which is caused to rotate by a gear 69 meshed with a pinion 70 on the shaft of the motor 60.

The gearing has been diagrammatically shown in such a manner that a multiplicity of cycles or energizations of the electrodes will take place during one cycle or revolution of the cams.

The operation of the apparatus may be summarized as follows:

The positions of the chucks 15, 27 at the beginning of the cycle are shown in Fig. 1. As shown by the broken lines, the respective pistons are in their uppermost position. The position of the burner 34 at the beginning of the cycle is shown by broken lines in Fig. 2.

The hollow complementary glass parts 71 and 72 are first preheated to a temperature of approximately 500° F., and are inserted into the chucks 15 and 27. The electric motor 60 is then energized and the cycle begun. The vacuum valves are first caused to open the lines $k$ and $l$ thereby evacuating the chambers 17, 29 of the respective chucks and causing the chucks to grip the glass parts 71, 72. The line $g$ to the burner positioning cylinder 39 is then supplied with air and the cylinder is operated to move the burner into position between the parts. The parts are then heated to a welding temperature by the action of the burner flame. The air to line $g$ is then cut off and the air is supplied to line $f$ in the opposite end of the burner positioning cylinder 39 to operate the cylinder and return the burner to its normal position away from the chucks.

Air is then supplied to the line $a$ and causes the vertical piston motor 13 to move the chuck 15 downward and bring the glass parts together. The lower chuck 27 is then moved downward by air entering the upper end of the lower motor 24 through the line $d$, and the parts are thereby stretched.

Air is then supplied to the line $h$ forcing the electrodes into contact with the glass and the energizing of the successive segments of the glass weld takes place. The weld is thereby maintained at the welding temperature for a predetermined length of time. The electrodes are then returned to their normal position out of contact with the glass by a vacuum supplied through the line $m$. The electrical energy supplied to the electrodes is not cut off until the electrodes have been pulled out of contact with the glass. This is advisable inasmuch as otherwise a fine web of glass would be pulled out by the electrodes. By cutting off the electrical energy very soon after the electrodes have been pulled out, the fine string or thread of glass is burned off by the spark occurring just prior to cut-off of the electrical energy.

The vacuum lines $k$ and $l$ are then closed and the chuck 15 is returned to its upward position by air supplied to the line b. The lower chuck is moved to its upward position by air supplied to the line e and the unitary hollow glass article is removed. The apparatus is then in position for another cycle.

If the complementary glass parts have become misaligned as shown in Fig. 3, either by being placed wrongly in the chucks or by slipping, the parts of the article may be aligned by relatively moving the parts rotatively. This may be accomplished by applying air to the corresponding end of the indexing piston motor 22 (Fig. 1) through manipulation of the hand valve 23.

The very advantageous results of this method may be more clearly understood by reference to Figs. 5, 6, 7, 8. As shown in Fig. 5, a heavy bead 75 is formed at the sealing surface when the glass parts are first brought together. The parts are then stretched and a double bead is formed as shown in Fig. 6. This bead is shown on an enlarged scale in Fig. 7, and it may be seen that the double bead comprises a bead 76 and a bead 77 separated by a thin or re-entrant portion 78. After electrical energization the smooth configuration 79 is obtained as shown in Fig. 8.

Although the particular sequence of steps disclosed above is found to give highly satisfactory results, it is conceivable that the steps may be varied to obtain particularly desired results. For example, if it were desired to extend the period of working or stretching the parts, the electrical energization might be applied simultaneously or concurrently with the working or stretching operations. The particular construction of the electrodes which is shown would permit the electrodes to yieldingly move with the relative movement of the glass parts.

Modifications may be resorted to within the spirit and scope of the appended claims.

I claim:

1. The method of producing a unitary, hollow glass article from preformed hollow complementary parts of said article, which method comprises positioning said parts in spaced relation with the edge surfaces thereof in register, heating the edge surface portions to a welding temperature by the application thereto of burning gases, relatively moving said parts toward each other and pressing said edges together while at a welding temperature thereby welding the parts together and concurrently forming a bead along the said edges by the compression of the glass, thereafter moving said parts in the opposite direction a sufficient distance to stretch the glass while still at a welding temperature and thereby reduce or eliminate the said bead, and maintaining the welding temperature of the glass at said surfaces during and after the stretching operation by passing an electric current through the glass.

2. The method of forming a unitary hollow glass article which comprises positioning complementary hollow parts of said article in spaced relation with marginal surfaces thereof in register and spaced apart, heating the marginal surface portions to a welding temperature by the application thereto of burning gases, bringing said surfaces together while at said temperature, relatively moving said parts in the opposite direction a sufficient distance to stretch the glass, bringing electrodes into contact with the molten glass at spaced points along said surfaces and causing an electric current flow through the molten glass between the electrodes sufficient to maintain the glass at a welding temperature along said surfaces for a predetermined length of time, simultaneously causing relative axial motion between said complemental parts and thereby aligning said parts, thereafter withdrawing the electrodes from said surfaces while the electric current flow is maintained, and cutting off the current flow immediately upon the withdrawal of the electrodes and while the latter are in close proximity to the welded surfaces.

3. The method defined in claim 1, the said electric current being applied to segmental portions of the weld in rapid succession, which portions encompass the article and together form the complete weld.

References Cited in the file of this patent

UNITED STATES PATENTS

| Number | Name | Date |
|---|---|---|
| 2,034,925 | Slayter et al. | Mar. 24, 1936 |
| 2,238,153 | Blau | Apr. 15, 1941 |
| 2,241,511 | Greene | May 13, 1941 |
| 2,244,291 | Eastus | June 3, 1941 |
| 2,254,086 | Owen | Aug. 26, 1941 |
| 2,306,054 | Guyer | Dec. 22, 1942 |
| 2,389,360 | Guyer et al. | Nov. 20, 1945 |
| 2,428,969 | Guyer | Oct. 14, 1947 |
| 2,596,694 | Kegg | May 13, 1952 |